Patented Jan. 15, 1946

2,392,915

UNITED STATES PATENT OFFICE 2,392,915

TREATMENT OF HYDROCARBONS

Aristid V. Grosse, Bronxville, N. Y., and Carl B. Linn, Riverside, Ill., assignors to Universal Oil Products Company, Chicago, Ill., a corporation of Delaware No Drawing. Application August 30, 1943,
Serial No. 500,552

11 Claims. (Cl. 260—683.4)

This is a continuation-in-part of our co-pending application Serial No. 416,862, filed October 28, 1941, which is in turn a continuation-in-part of our application Serial No. 299,108, filed October 12, 1939, and which is also a continuation-in-part of our application Serial No. 248,777, filed December 31, 1938 now Patent No. 2,267,730, granted December 30, 1941.

This invention relates to a process for treating hydrocarbon mixtures to remove fluorine therefrom. More specifically it relates to the treatment of synthetic hydrocarbons produced in the presence of active fluoride catalysts to remove small amounts of organically combined fluorine present in compounds admixed with the hydrocarbons. The invention is particularly adapted to the treatment of hydrocarbons produced by alkylation of isoparaffinic hydrocarbons with olefinic hydrocarbons using active fluoride catalysts, including hydrogen fluoride and mixtures comprising essentially hydrogen fluoride and boron fluoride.

The alkylation of branched chain paraffinic hydrocarbons such as isobutane and isopentane with olefinic hydrocarbons to produce saturated liquid hydrocarbons utilizable as gasoline motor fuels with high antiknock properties, is a recent development which is beginning to assume commercial importance. By this means relatively low-boiling isoparaffinic hydrocarbons may be alkylated with low-boiling olefins, thereby converting materials which have relatively low commercial value into hydrocarbons with high antiknock values, said hydrocarbons being particularly useful as components of aviation gasoline.

Active fluoride catalysts including hydrogen fluoride, hydrofluoric acid and mixtures comprising essentially hydrogen fluoride and boron trifluoride are used in the alkylation of saturated hydrocarbons including isoparaffins and certain naphthenic hydrocarbons by olefins, but it has been found that the resultant alkylation product frequently contains minor quantities of fluorine in combination with some of the hydrocarbon radicals, possibly due to interaction of hydrogen fluoride with olefinic constituents of the reaction mixture. Boron fluoride assists hydrogen fluoride in catalyzing the alkylation of an isoparaffin by ethylene and higher olefins, but in this case also the product contains small quantities of fluorides as do those formed in the presence of hydrogen fluoride from an isoparaffin and an olefin of higher molecular weight than ethylene.

Although the fluorine content of the hydrocarbon product of gasoline boiling range is rarely very high, the presence of fluorine is undesirable both from the standpoint that the combustion products of such a fuel are extremely corrosive, as well as the fact that its antiknock value, generally expressed by the term "octane number," is considerably reduced either when the gasoline is used as such, or when a small amount of an antidetonating agent such as lead tetraethyl is added thereto. Thus it may be shown that a gasoline fraction containing as much as 0.1% by weight of fluorine has inferior antiknock properties particularly as concerns its response to lead tetraethyl as compared to the otherwise same material which contains substantially no fluorine compounds. The present invention offers a method for reducing the fluorine content of the hydrocarbon alkylation product to a point where this adverse effect is no longer substantial.

Broadly, the invention comprises contacting hydrocarbons containing organically combined fluorine with porous carbon in the presence of a minor amount of hydrogen fluoride whereby to remove said combined fluorine.

In one specific embodiment the present invention comprises a process for treating hydrocarbons produced by catalytic alkylation of isoparaffins with olefins in the presence of an active fluoride catalyst, by contacting said hydrocarbons with activated carbon in the presence of minor amounts of hydrogen fluoride under dehydrofluorinating conditions of temperature and pressure, and recovering the treated hydrocarbon.

The carbon contact agent may be prepared from any of a number of available forms of carbon, e. g., coke, graphite, charcoal, carbon black, etc., but as a general requirement the contact mass should possess a porous structure. Granular coke and charcoal in their usual forms are usually sufficiently porous for direct use, but in the case of graphite or certain other forms of carbon it is generally desirable to prepare porous contact masses, e. g., by admixing carbon particles and a binder, forming into suitable contact shapes or granules, and heating or leaching to remove the binder. Porous carbon contact masses are generally adsorbent and possess considerable surface area which promotes the dehydrofluorination effect. In the preferred embodiment of the invention activated carbon is employed since it has been found to produce excellent results in the present dehydrofluorination process.

According to the preferred embodiment of the present invention the liquid hydrocarbon product containing organic fluorine compounds and small amounts of dissolved hydrogen fluoride obtained from alkylation in the presence of a catalyst containing hydrogen fluoride is contacted with activated carbon at a temperature generally of from about 20° to about 150° C. although sometimes higher temperatures are utilized. This dehydrofluorination treatment in the presence of activated charcoal or other types of activated carbon is preferably carried out at a temperature of about 100° C. while passing the hydrocarbon through a fixed bed of granular activated carbon at a liquid space velocity of between about 1 and 10, although powdered charcoal may also be used under revised conditions of operation. At higher temperatures higher space velocities are employed. The term "liquid space velocity" refers to the volume of liquid hydrocarbon product charged per volume of granular activated carbon per hour. The pressure used during defluorination treatment may be atmospheric, subatmospheric, or superatmospheric, the last-named being used mainly in the interest of increasing the treating capacity of the apparatus employed, even though the defluorination reaction is favored by lower pressures.

The term "activated carbon" as used in the present specification and claims is intended to include any type of prepared carbon or carbonaceous material which is more or less granular and possessed of good porosity and structural strength and which has been prepared by general steps involving the leaching of adsorbed materials from granular residual carbonaceous materials such as wood char and various varieties of coke by mineral acids and by the controlled heating, preferably under vacuum, to expel adsorbed liquids and gases. It is recognized that various forms of active granular carbon will vary considerably in their adsorptive capacities and therefore in the amounts of hydrogen fluoride that they will adsorb and retain.

We have found that organic fluoride-containing compounds present in alkylation products formed by interaction of isoparaffins with olefins in the presence of active fluoride catalysts containing hydrogen fluoride are converted into substantial amounts of saturated hydrocarbons and hydrogen fluoride by contact under the above indicated treating conditions with activated charcoal and other forms of activated carbon.

While the following concept should not be misconstrued to limit the invention, it is likely that the activated charcoal or other form of porous carbon itself exerts a dehydrofluorinating influence upon alkyl fluorides present in the alkylation products even at room temperature. Also, alkylation products which are separated from a hydrogen fluoride-containing catalyst by settling or other mechanical means of separation, contain small amounts of dissolved hydrogen fluoride. Such dissolved hydrogen fluoride is adsorbed by the activated charcoal or porous carbon and in the adsorbed condition functions further to decompose alkyl fluorides and liberate hydrogen fluoride. This reaction may involve the conversion of an alkyl fluoride molecule into a molecule each of olefin and hydrogen fluoride. The olefin so liberated in the presence of hydrogen fluoride is able to combine with a molecule of an isoparaffin to produce a molecule of a higher boiling paraffinic hydrocarbon. Thus the combined action of hydrogen fluoride dissolved in the alkylation product and of an added activated or porous carbon effects decomposition of alkyl fluorides and yields a substantially fluorine-free hydrocarbon product.

In operating the present process it is generally advisable to employ at least two contactors containing porous carbon so that one may be in use while the other is being heated and/or evacuated to remove therefrom the hydrogen fluoride adsorbed upon the carbon during the treating period. The hydrogen fluoride or a mixture of hydrogen fluoride and boron trifluoride (in case alkylation is effected in the presence of the mixed catalyst) so recovered may be recycled to further use in the process as alkylating catalyst.

The following example is given to show results obtained in the operation of the process, but should not be considered to unduly limit the broad scope of the invention.

A liquid mixture of isobutane and isobutene containing 36% by volume of the latter was charged to a reactor of 1000 volumes capacity containing 212 volumes of anhydrous hydrogen fluoride maintained at 30° C. under the vapor pressure of the total mixture. No additional hydrogen fluoride was added during the run while the hydrocarbon mixture was introduced directly into the stirred hydrogen fluoride layer at a rate varying between 200 and 300 volumes per hour. The reaction product together with unreacted isobutane thus filled the reactor above the hydrogen fluoride catalyst. This mixture of alkylate, isobutane, and small amounts of dissolved hydrogen fluoride was then withdrawn from near the top of the reactor into a contactor containing a fixed bed of activated charcoal. Hydrogen fluoride dissolved in the hydrocarbon mixture was retained by the activated charcoal and substantial amounts of alkyl fluorides were also removed from the hydrocarbon product. Thus the fluorine-content of the butane-free alkylation product was less than 0.01% after the charcoal treatments. Alkylation product which had not been so treated with activated charcoal but which had been freed from dissolved hydrogen fluoride by washing with caustic and water contained about 0.2% of organically combined fluorine.

The character of the present invention and particularly its practical value are evident from the preceding specification and example given.

We claim as our invention:

1. A process for purifying a hydrocarbon mixture containing as an impurity a relatively small percentage of organically combined fluorine to remove fluorine therefrom which comprises contacting said mixture with activated carbon in the presence of a minor amount of hydrogen fluoride under dehydrofluorinating conditions of temperature and pressure, and recovering the treated hydrocarbon mixture.

2. A process for purifying a hydrocarbon mixture containing as an impurity a relatively small percentage of dissolved organic fluorine compounds to remove fluorine therefrom which comprises contacting said mixture with activated carbon in the presence of a minor amount of hydrogen fluoride under dehydrofluorinating conditions of temperature and pressure, and recovering the treated hydrocarbon mixture.

3. A process for purifying a hydrocarbon mixture containing as an impurity a relatively small percentage of alkyl fluorides to remove fluorine therefrom which comprises contacting said mixture with activated carbon in the presence of a minor amount of hydrogen fluoride under dehydrofluorinating conditions of temperature and pressure, and recovering the treated hydrocarbon mixture.

4. A process for purifying a hydrocarbon mixture containing as an impurity a relatively small percentage of dissolved organic fluorine compounds and produced by catalytic alkylation of an isoparaffinic hydrocarbon with an olefinic hydrocarbon in the presence of an active fluoride catalyst which comprises, contacting said mixture with activated carbon in the presence of a minor amount of hydrogen fluoride under dehydrofluorinating conditions of temperature and pressure, and recovering the treated hydrocarbon mixture.

5. A process for purifying a hydrocarbon mixture containing as an impurity a relatively small percentage of dissolved organic fluorine compounds and produced by catalytic alkylation of an isoparaffinic hydrocarbon with an olefinic hydrocarbon in the presence of an active fluoride catalyst which comprises, contacting said mixture with activated carbon in the presence of a minor amount of hydrogen fluoride at a temperature of from about 20° to about 150° C., and recovering the treated hydrocarbon mixture.

6. In a process for alkylating an isoparaffinic hydrocarbon with an olefinic hydrocarbon in the presence of an active fluoride catalyst containing hydrogen fluoride, the improvement which comprises separating a substantial proportion of the catalyst from a reaction mixture comprising essentially a substantially saturated alkylate, unconverted isoparaffinic hydrocarbon, dissolved hydrogen fluoride, and small amounts of organic fluorine compounds, contacting said reaction mixture with activated carbon under dehydrofluorinating conditions of temperature and pressure, and recovering the treated hydrocarbons.

7. In a process for alkylating an isoparaffinic hydrocarbon with an olefinic hydrocarbon in the presence of an active fluoride catalyst containing hydrogen fluoride, the improvement which comprises separating a substantial proportion of the catalyst from a reaction mixture comprising a substantially saturated alkylate, unconverted isoparaffinic hydrocarbon, dissolved hydrogen fluoride, and small amounts of organic fluorine compounds, and contacting said reaction mixture with activated carbon at a temperature of from about 20° to about 150° C. to remove therefrom substantially all fluorine compounds.

8. A process for purifying a hydrocarbon mixture containing as an impurity a relatively small percentage of organically combined fluorine to remove fluorine therefrom which comprises contacting said mixture with porous carbon in the presence of a minor amount of hydrogen fluoride under dehydrofluorinating conditions of temperature and pressure, and recovering the treated hydrocarbon mixture.

9. A process for purifying a hydrocarbon mixture containing as an impurity a relatively small percentage of dissolved organic fluorine compounds and produced by catalytic alkylation of an isoparaffinic hydrocarbon with an olefinic hydrocarbon in the presence of an active fluoride catalyst which comprises, contacting said mixture with porous carbon in the presence of a minor amount of hydrogen fluoride under dehydrofluorinating conditions of temperature and pressure, and recovering the treated hydrocarbon mixture.

10. A process for purifying a hydrocarbon mixture containing as an impurity a relatively small percentage of dissolved organic fluorine compounds which comprises, contacting said mixture with porous carbon in the presence of a minor amount of hydrogen fluoride at a temperature of from about 20° to about 150° C., and recovering the treated hydrocarbon mixture.

11. In a process for alkylating an isoparaffinic hydrocarbon with an olefinic hydrocarbon in the presence of an active fluoride catalyst containing hydrogen fluoride, the improvement which comprises separating a substantial proportion of the catalyst from a reaction mixture comprising essentially a substantially saturated alkylate, unconverted isoparaffinic hydrocarbon, dissolved hydrogen fluoride, and small amounts of organic fluorine compounds, contacting said reaction mixture with porous carbon under dehydrofluorinating conditions of temperature and pressure, and recovering the treated hydrocarbons.

ARISTID V. GROSSE.
CARL B. LINN.